June 5, 1928.
H. R. EDWARDS
1,671,981
PROCESS FOR DESTROYING WEEDS, PARTICULARLY AQUATIC WEEDS AND PLANTS
Filed June 16, 1925
3 Sheets-Sheet 2
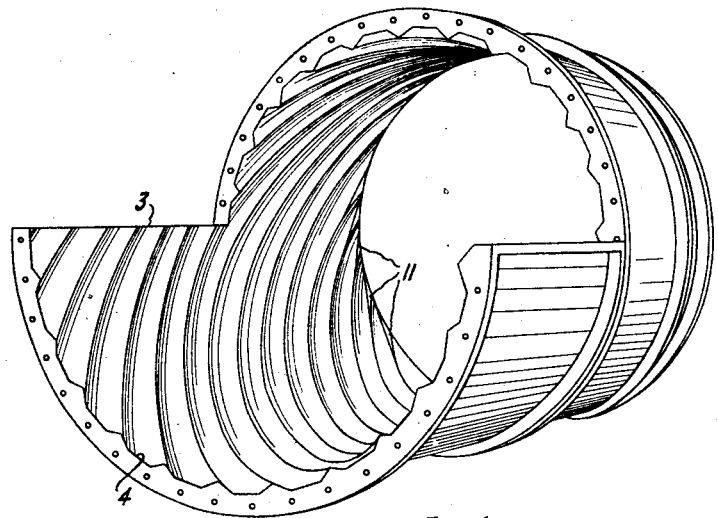
FIG. 4.
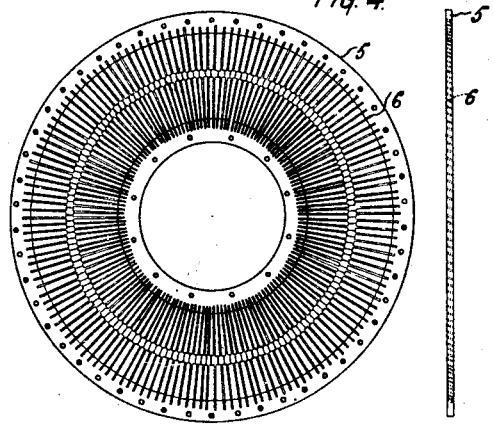
FIG. 5.
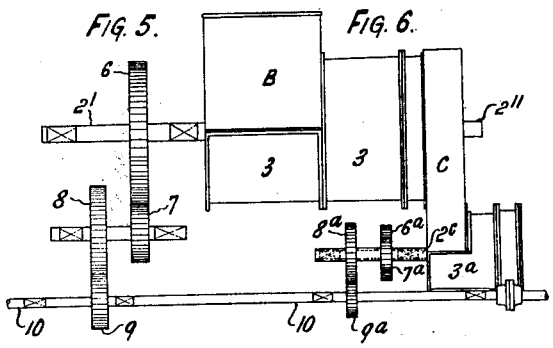
FIG. 6.
FIG. 11.

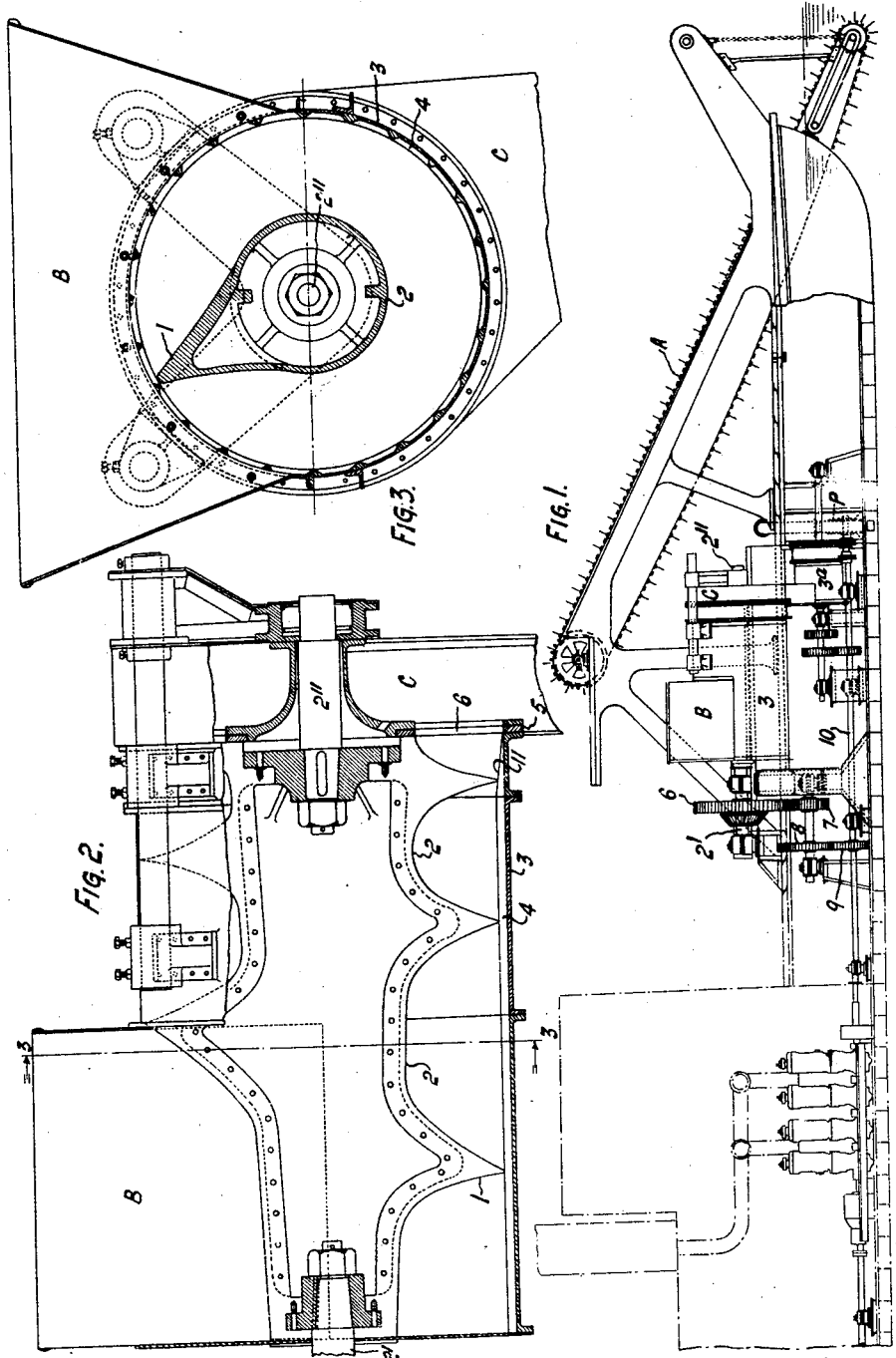

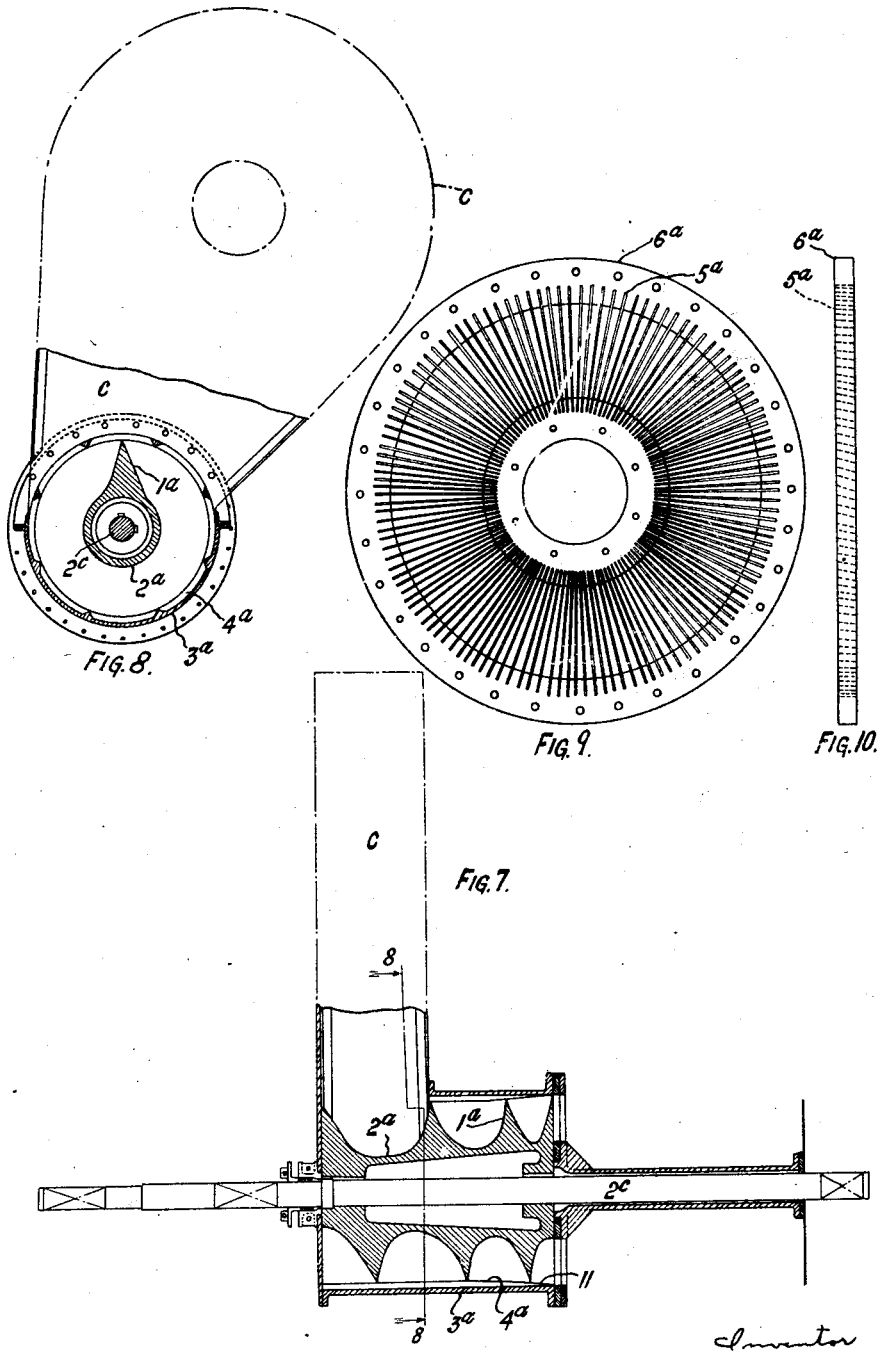

Patented June 5, 1928.

1,671,981

UNITED STATES PATENT OFFICE.

HARRY RICHARDS EDWARDS, OF RANGOON, BURMA.

PROCESS FOR DESTROYING WEEDS, PARTICULARLY AQUATIC WEEDS AND PLANTS.

Application filed June 16, 1925, Serial No. 37,460, and in Great Britain October 20, 1924.

This invention relates to a process for destroying weeds, more particularly intended for destroying aquatic plants and weeds such as water hyacinth.

Water hyacinth is a native of South America (Venezuela and Colombia), whence it has spread throughout the tropical world, and, in consequence of its enormous reproductive power, it has become a menace to water transport in many places. At certain seasons rivers in Bengal, Burma and America, are blocked by dense masses of this weed; and transport over large areas is brought to a stoppage. Also irrigation channels are filled with the weeds which overflow on to cultivated land and reduces or destroys the crops. One plant measuring 0.5 of a square foot will in 40 days reproduce and cover an area of 600 square feet. It reproduces from four sources, the roots, runners, bulbs and flowers. It varies in height from 4-ft. to 5-ft., and consists of 96% water and only 4% solids.

There are only six poisons known (all deadly to animal life) which will affect water hyacinth, and none of these will kill it unless applied to the root.

Hitherto all efforts to deal with water hyacinth by mechanical means have failed, for one of two reasons; either they did not kill it, or the quantity treated was negligible, the cost of operation in all cases being prohibitive.

The object of the apparatus forming the subject of the present invention is threefold; firstly, to destroy the weed, secondly, to dispose of the residue without creating a nuisance by decomposition, and, thirdly, to deal with large quantities.

The operation is carried out in two stages. In the primary stage the weed is bruised, compressed and divided (without dehydration) to such an extent that it dies. If ejected at this stage the weed will float on the water, decomposing and giving off an offensive odour, but it will not regerminate. In the second stage the divided weed is reduced to a pulp which, on being deposited in the water, sinks.

For bruising, compressing and dividing the weed there is employed a unit of apparatus including a screw having a thread of non-uniform pitch and depth and enclosed in a casing formed on its inner surface with flutings or grooves. The front end or discharge of the casing is fitted with registers or discs which carry radial blades, set at suitable spacings and angles. The rear end of the casing is fitted with a feed hopper. The casing is held stationary and the screw is rotated by means of gearing. At the discharge end of such apparatus and immediately below it, is disposed a unit for performing the second stage of the operation. Such second unit is in effect a reduced replica of the first, the pitch of the thread on the screw and the spacing of the blades at the discharge, being different to meet the altered condition of the divided weed. The second unit discharges into a sump, whence the pulp is lifted and discharged into the water by means of a sand type of pump. The grooves in the casings are tapered away at the discharge end.

The apparatus is most conveniently installed in a ship equipped with elevators which lift the weed from the water and allow it to fall into the feed hopper of the first stage unit.

In the accompanying drawings Fig. 1 is a diagrammatic view of a ship fitted with weed-destroying apparatus for performance of the process of the invention; Fig. 2 is a part longitudinal section part elevation of the first stage unit or apparatus; Fig. 3 is a section on the line 3—3 of Fig. 2; Fig. 4 is a perspective view of the casing of the first stage unit; Figs. 5 and 6 are elevations at right angles to one another of a knife disc of the first stage unit; Fig. 7 is a longitudinal section of the second stage unit; Fig. 8 is a section on the line 8—8 of Fig. 7; Figs. 9 and 10 are elevations at right angles to one another of the knife discs of the second stage unit or apparatus; Fig. 11 is an elevation showing the arrangement of gearing used to drive the rotary members of the apparatus.

Referring to the drawings, A indicates conventionally an elevator which supplies the weed to the hopper B of the first stage unit or apparatus, and C the hopper in which the weed is transferred from the first to the second stage unit or apparatus.

The first stage unit or apparatus includes a screw 1 having a thread of non-uniform pitch on a conical boss 2, mounted between a rotary shaft 2' and a trunnion 2", and enclosed in a stationary casing 3 formed on its inner surface with a plurality of helical grooves 4. The screw 1 as shown is conveniently hollow and cast in halves bolted together. The forward or discharge end of the casing 3 is fitted with concentric discs 5 which carry blades or knives 6, suitably spaced and angled. The rear end of the casing 3 is attached to the feed hopper B and the discharge end is open to the hopper C. The rotary shaft 2' is connected through a train of gears 6, 7, 8 and 9 to a driving shaft 10. The hopper C is mounted on the rear end of the casing $3^a$ of the second stage unit, so that weed discharged from the first stage unit is fed directly to the second stage unit.

The secondary stage unit is approximately a reduced replica of the first stage unit, the pitch of the thread on the screw $1^a$, and the spacing of the blades $6^a$ in the knife discs $5^a$, at the discharge end of the casing $3^a$, being altered to meet the altered condition of the divided weed. The boss $2^a$ of the screw $1^a$ is mounted on a rotary shaft $2^c$, driven from the driving shaft 10 through gearing $6^a$, $7^a$, $8^a$ and $9^a$ at a much higher speed than the first stage unit. The secondary stage unit discharges into a sump, whence the pulp is lifted and discharged into the water, by means of a suitable pump of the sand type, conventionally represented by P. The grooves 4, $4^a$, in the casings 3, $3^a$, taper away at the discharge ends, as shown at 11, in order to allow free passage for the weed between the grooves in the casings and ensure a complete discharge.

In operation the weed is charged into the feed hopper B and thence fed to the first stage apparatus. The first revolution of the screw 1 partially divides the weed, bruising it at the same time by passing it over and between the grooves 4 in the casing 3. The second revolution carries it into the cylindrical portion of the casing, where compression is commenced by means both of the decreasing pitch and increasing cone diameter. The third revolution increases compression to a maximum and, rotary motion of the weed being arrested by the blades 6 at the discharge end of the casing, the weed is forced between the blades and so divided. The divided weed falls through the hopper C into the casing $3^a$ of the second stage apparatus. The air spaces in the weed formed by the leaves, stalks and bulbs, have now been eliminated and the volume reduced to 25% of the original volume.

The mass is now subjected in the secondary apparatus to so great a pressure by means of the rapidly decreasing screw pitch, together with high peripheral speed, that it becomes pulp in passing over the blades $6^a$. The action of the centrifugal pump P (while in no way being essential to or part of the invention, as the pulp will now sink on discharge) reduces the pulp to a more finely divided state.

The blades at the discharge end of the casings are in single units, held at the desired angle by the registers or knife-carrying discs and secured by means of a covering ring in segments. The blades in the first stage apparatus are angle-bossed at the centre to give additional strength and to divide the length of the discharge.

I claim:—

A process for destroying water hyacinth and like weeds and aquatic plants consisting in elevating the weed from the water, bruising, compressing and dividing the weed, pulping the divided weed and discharging the pulp.

In testimony whereof I have signed my name to this specification.

H. R. EDWARDS.